Oct. 27, 1964   J. H. STAAK   3,153,942
LINEAR ACTUATING ARRANGEMENT
Filed Dec. 27, 1960   2 Sheets-Sheet 2
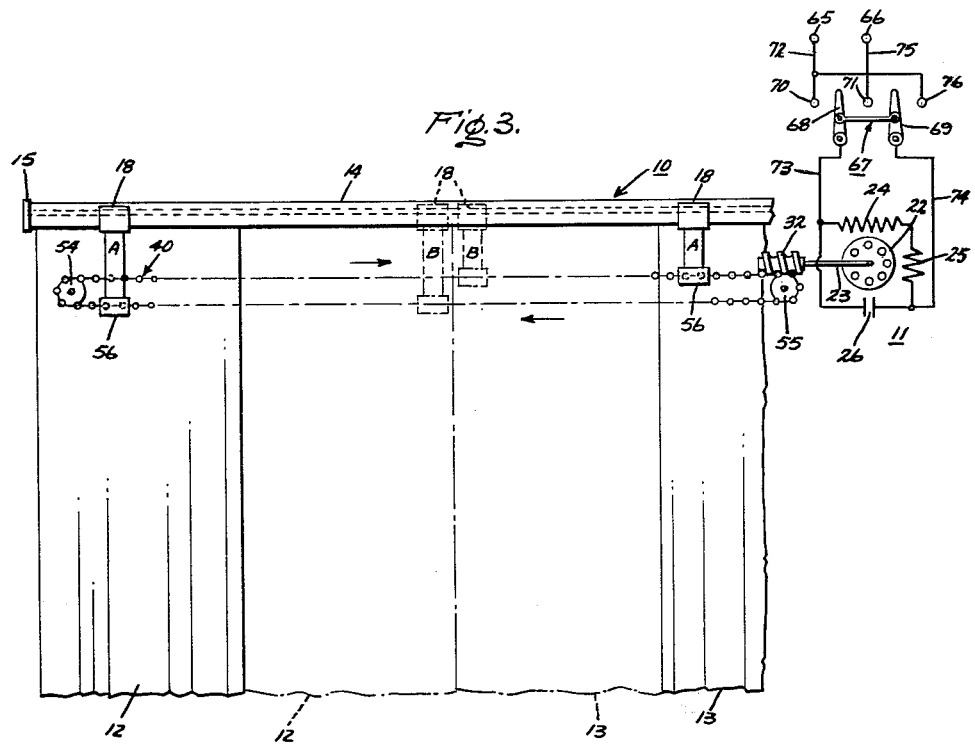
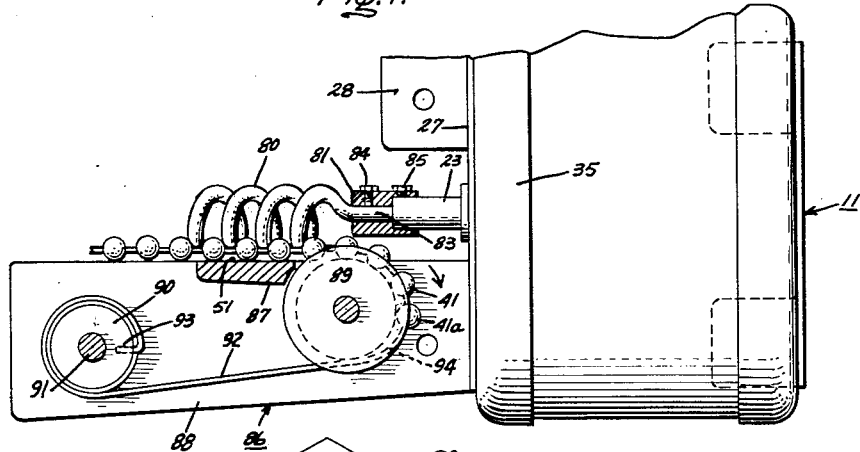
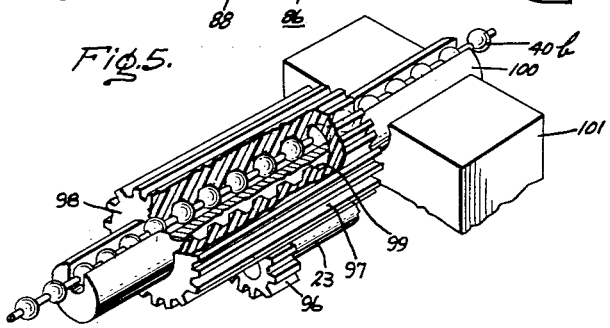
Inventor:
Julius H. Staak,
by John M. Stoudt
Attorney.

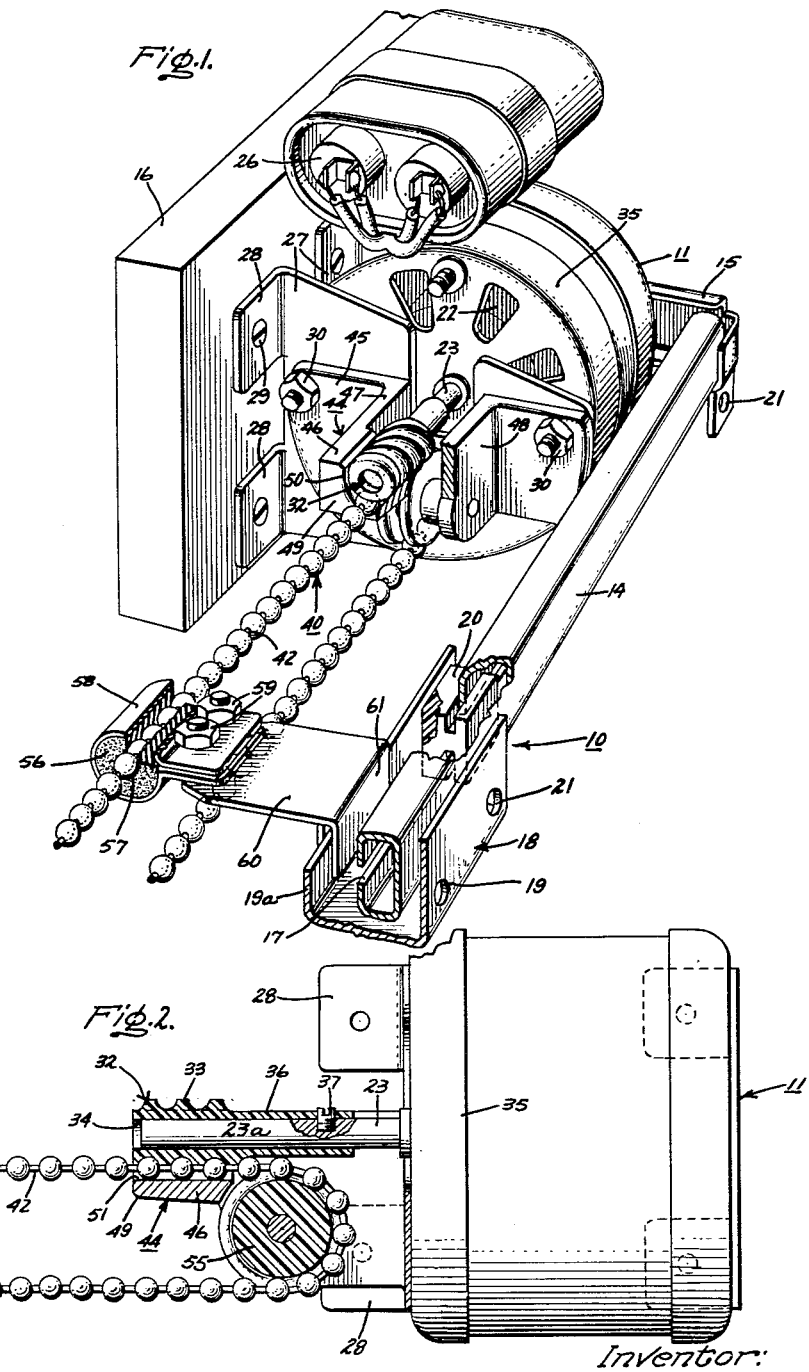

United States Patent Office 3,153,942
Patented Oct. 27, 1964

3,153,942
LINEAR ACTUATING ARRANGEMENT
Julius H. Staak, Fort Wayne, Ind., assignor to General
Electric Company, a corporation of New York
Filed Dec. 27, 1960, Ser. No. 78,435
10 Claims. (Cl. 74—425)

This invention relates to linear motion actuating mechanisms and more particularly, to an improved arrangement for converting rotary motion into linear motion at relatively low speeds.

It is an object of the present invention to provide an improved arrangement for converting rotary motion into linear motion.

It is another object of the invention to provide an improved linear actuating arrangement for translating the rotary motion of an electrically operated means directly into linear motion of a bead chain at relatively low speeds.

Yet another object is the provision of an improved yet relatively inexpensive linear actuating mechanism, including an electric motor, worm gear and cooperating elongated flexible bead chain, which may be readily employed as a unit and is suitable for use with a variety of applications already installed having linear traveling devices.

It is still a further object of the present invention to provide an improved means for automatically discontinuing operation of the traveling device thereby serving to prevent damage to any component part of the linear actuating mechanism which might otherwise occur were the device permitted to move further in a linear direction.

It is still another object of this invention to provide an improved means, including a highly effective and efficient gear reduction construction, utilizing relatively inexpensive component parts for converting rotary motion into rectilinear movement of a flexible bead chain.

In carrying out the objects of this invention in one form thereof, I provide an improved arrangement for driving a traveling device in a linear direction. The arrangement includes an elongated flexible bead chain having a plurality of spaced apart beads joined together at regular intervals by a number of links to define in effect a gear pitch. The traveling device is connected to move with the chain which, in turn, has a length of its beads in direct engagement with the helical threads of a worm gear driven by an electric motor. An assembly, positioned adjacent the worm and carried by the motor, has a groove disposed adjacent the helical threads for receiving the chain and maintaining it in positive engagement with the threads to prevent relative slippage between the worm and chain.

By a further aspect of the invention, the connection between the traveling device and the chain may take the form of a friction connection such that the chain drives the device until a predetermined load is applied to the device; e.g. an obstruction in the path of travel of the device, at which time the chain is enabled to slip relative to the device thereby permitting continued rotation of the worm gear and linear movement of the chain without a corresponding movement in a linear direction of the traveling device.

The subject matter which I regard as my invention is particularly pointed out and distinctly claimed in the concluding portion of the specification.

My inveniton, itself, however, both as to its organization and method of operation, together with further objects and advantages thereof, may best be understood by reference to the following description taken in connection with the accompanying drawings.

In the drawings:

FIG. 1 is a fragmentary view in perspective, partially broken away to show detail, of a reversible linear actuating mechanism, which incorporates the invention in one form thereof, being employed to operate a traveling device of a standard drapery fixture, with the traveling device illustrated in the full open position;

FIG. 2 is a side view, partially broken away and partially in section, of the linear actuating mechanism of FIG. 1 to show detail;

FIG. 3 is a schematic representation of the drapery fixture of FIG. 1, illustrating a pair of drapery traveling devices, driven by an endless bead chain, in the full open and closed positions as well as an electric circuit which may be employed to operate the linear actuating mechanism of FIG. 1 for moving the traveling devices in either linear direction;

FIG. 4 is another embodiment of the linear actuating mechanism of the present invention, partially broken away and partly in section to illustrate detail; and FIG. 5 is a fragmentary perspective view, partially broken away, of yet another embodiment of the invention used in connection with a gear reduction arrangement.

Referring now to the drawings, FIGS. 1 through 3 inclusive show one form of the present invention employed in connection with a window drapery fixture 10 to translate the rotational force generated by an electric motor power means, identified by numeral 11, of my improved linear actuating mechanism directly into controlled linear motion for opening and closing window drapes.

The illustrated fixture 10 is of a commercially available kind in common use today for slidably supporting a pair of window drapes, pictorially seen in part in FIG. 3 and indicated respectively by reference numerals 12 and 13. Fixture 10 includes a horizontal rod 14, supported at each end in the usual way across the top of a window (not shown) in spaced relation thereto by a suitable bracket 15 which in turn is mounted to a wall or frame 16. Rod 14 is generally C-shaped in cross section and has a longitudinally extending channel 17 to provide a track along which two substantially identical traveling devices 18 move. FIG. 1 shows a portion of one of the devices which includes a U-shaped member 19 and two spaced apart bearings 20 (one being shown), suitably attached thereto, adapted to ride in channel 17. From FIG. 1 it will be observed that the bearings hold inner leg 19a of member 19 away from rod 14 in the conventional way. Each of the traveling devices 18 and brackets 15 have a plurality of holes 21 from which the drapes may be suspended.

For purposes of illustration only, electric motor 11 is shown as a conventional fractional horsepower reversible motor of the alternating current induction permanent split capacitor type, having a standard squirrel-cage rotor 22 (FIG. 3) secured to a rotor shaft 23. As schematically represented in FIG. 3, the motor also has a main winding 24 and an auxiliary winding 25 with capacitor means 26 arranged in the winding circuit to provide reverse rotation of the rotor and shaft 23 in the well-known manner. Motor 11 may be conveniently mounted adjacent one of the fixture brackets 15, between rod 14 and frame 16, by any appropriate means. The specific means illustrated in FIG. 1 takes the form of an L-shaped bracket, disposed on each side of the motor, having the feet 28 of the bracket fastened to frame 16 by screws 29 and the upright leg secured to the motor by a plurality of through bolts and nuts 30. With this motor mounting arrangement, motor 11 as well as fixture 10 will be hidden from view by the drapery at all times.

Referring now to FIGS. 1 and 2, the illustrated embodiment of the present invention for converting the rotary motion of rotor shaft 23 into rectilinear motion for operating the draperies comprises a worm member, generally indicated by numeral 32 having a helical thread 33, and a central bore 34 for receiving one end 23a of rotor shaft 23 which extends axially beyond the motor casing 35 toward bracket 15 disposed at the opposite end of fixture 10. Worm 32 may be secured to rotate with shaft 23 by any suitable means, e.g. by forming the worm with a collar extension 36 and having set screw means 37 projecting radially through the collar into shaft 23. Worm 32, as shown, is of the single threaded type and is preferably composed of a polyester, such as nylon, which requires no lubrication of its threaded portion.

An elongated flexible bead chain 40 acts as a driven worm wheel and is arranged in operative engagement with threads 33 of worm 32. Chain 40 consists of a plurality of equally spaced apart balls or beads 41, flexibly joined together by links 42 into an endless chain having the equivalent of a gear pitch, each bead preferably being independently rotatable about the axis of the adjacent links. This type of chain is relatively inexpensive and is readily available on the market. Although it is desirable that the chain conforms in effect to the pitch of the worm, due to the flexible nature of the chain, an accurately formed worm is not essential to the satisfactory operation of the arrangement.

In order to maintain bead chain 40 in a firm and proper engaging relationship with respect to the threads of worm 32, chain supporting element, denoted by reference numeral 44 in FIGS. 1 and 2, is provided. In the illustrated form, element 44, die cast of suitable metal or formed of molded plastic material, has a section 45 fastened to the face of motor mounting bracket 27 by through bolts 30, and has a section 46 integrally formed with section 45, projecting axially away from bracket 27. Preferably, section 46 includes two spaced apart substantially parallel side walls 47 and 48 disposed on either side of rotor shaft end 23a, the walls being integrally joined together at one end by section 45 and at the other end by a transverse block 49. An opening 50 is formed axially along the upper surface of the block, slightly greater in diameter than the diameter of worm 32 for accommodating at least a part of the circumferential dimension of the worm. An axially extending groove 51, having a U-shaped cross section, is cut into the block wall, which defines opening 50, and extends substantially parallel to the axis of the worm. For best results, groove 51 has a radial depth equivalent to the sum of one-half the bead diameter plus the total diameter of a link. With this construction, groove 51 forms a guide for bead chain 40 and urges the individual beads into positive engagement with the threads of the worm, but the groove does not interfere with the free running of the chain therethrough. If desired, worm 32 may, of course, be utilized to drive several bead chains simultaneously and under these circumstances, several grooves, similar in configuration to groove 51, may be provided at spaced apart intervals around the circumference of opening 50 to accommodate the additional bead chains.

Endless flexible bead chain 40 is movably carried for continuous linear movement on two small idler pulleys 54 and 55 (FIG. 3), one disposed in the vicinity of each fixture bracket 15 so that one run of the chain loop extends horizontally above the other run. Pulley 55, for instance, as best seen in FIGS. 1 and 2, may be rotatably mounted between element walls 47 and 48, axially behind element block 46, with the circumferential groove of the pulley being in alignment with chain guide groove 51 so that there will be no binding experienced between chain 40 and pulley 55 or between chain and guide groove 51 as the worm drives chain 40 through the guide groove 51. It will be appreciated, of course, that the chain should be arranged on the pulleys under sufficient tension to insure proper linear movement of the chain when operated by worm 32. This may be readily accomplished by making pulley 54 adjustable toward and away from pulley 55.

In order to effect longitudinal movement of the traveling device 18 upon rotation of worm 32, a traveling device 18 is connected to move with each run of the endless bead chain 40. In the preferred form, the connection (FIG. 1) constitutes a cylindrical resilient grommet 56, made from rubber for example, provided with a central circular hole 57 through which chain 40 passes. Hole 57 should be somewhat smaller in diameter than the diameter of the individual beads 41 of chain 40 so that a frictional engagement results between the grommet 56 and chain 40 for a purpose which will be later explained. Grommet 56 and traveling device 18 are coupled together to move as a unit by an arm and clamp arrangement in which a strap 58 secures the grommet, as by screws and nuts 59, to arm 60 of extension 61 which, in turn, is formed with a forked end 62, bent perpendicular with respect to arm 60. End 62 is adapted to fit over and be supported by leg 19a of traveling device 18.

Turning now to FIG. 3, there is schematically represented one possible electrical circuit for energizing and de-energizing windings 24 and 25 and for achieving a reversal of rotation of rotor 22, and consequently of worm 32. In the illustrated circuit, the windings are adapted to be excited from an external alternating current power source 65 and 66 through a manual switch 67 having contactors 68 and 69 which are shown in the "off" position. When the contactors are moved to the extreme left position in FIG. 3, that is, into engagement with switch contacts 70 and 71, the winding circuit is established through conductors 72, 73, 74, and 75 to energize the windings for one direction of rotation of rotor 22. On the other hand, when switch contactors make contact with contacts 71 and 76 (the right position as viewed in the drawings) the motor is caused to rotate in the reverse direction, the theory for the reverse operation of the motor being well understood by those skilled in the art.

The novel features and advantages of the present invention will become even more apparent from the following description of the operation of my improved linear actuating mechanism. Still referring to FIG. 3, let it be assumed that the drapes 12 and 13 along with their respective traveling devices 18 are initially in the open position, indicated by the solid lines and denoted by letter "A," and switch 67 is located in the "off" position, as shown. Assuming further that the closing of contacts 71 and 76 produces a rotation of rotor 22 and shaft 23 such that bead chain 40 will be driven by worm 32 in the direction of the arrows, then the manual operation of switch 67 from the "off" position to close contacts 71 and 76 will energize the motor to move the traveling devices 18 and attached drapes toward each other to their respective closed position, identified by "B" and illustrated by the broken lines in FIG. 3. As worm 32 drives beads 41 through the confining groove 51, the beads act as rollers, and a highly efficient, yet inexpensive positive drive is provided for direct conversion of rotary motion of worm 32 into linear motion of chain 40 and traveling devices 18 without the assistance of additional gearing.

When the drapes and traveling devices 18 have reached the extreme limit of their movement of translation; i.e., the closed position "B," the friction connection between the chain and the individual traveling device 18 will be overcome due to the resistance to movement of the devices occurring as they approach their respective fully closed positions "B," for example, when the devices contact each other and are prevented from further movement. Since chain 40 is permitted to slide through grommet 56, the drive between the motor and each device 18 is in effect disengaged, and further relative axial movement in the direction of the arrows of the drapes is prevented regardless whether or not rotor 22 of motor 11 and worm 32 continue to rotate.

It should be noted at this point that the friction connection is preferably sufficient to insure proper operation of the drapes under normal conditions, while allowing chain 40 to slip relative to grommet 56 should the movement of either drape be stopped momentarily by some obstruction, such as an improperly placed piece of furniture in the path of the drape. Under these circumstances, the drive will be disengaged in the manner set out above until the object has been removed from engagement with the drape. However, the linear movement of the unaffected drape will be unimpaired and it will continue to move independently of the movement of the other drape, until it has reached the desired position.

This relative slippage, occurring between bead chain 40 and grommet 56, has the additional effect of keeping beads 41 of the chain free of foreign particles which might otherwise tend to clog groove 51 and adversely affect operation of the arrangement. The friction connection also allows the drapes to be moved by hand, without requiring the rotation of the worm and rotor, especially desirable if a worm is employed having such a low helix angle that the worm cannot be driven by the bead chain.

If now the direction of the driving motor is reversed by closing switch contacts 70 and 71, so as to cause worm 32 to be rotated in a direction opposite to that first assumed, traveling devices 18 and their associated drapes 12 and 13 wil travel to their respective full open positions "A." Since this operation is essentially the same as that described above for moving the drapes to the full closed position, the foregoing explanation will serve to describe the movement in either direction. Suffice it to say that once the drapes have reached the full open or closed positions, the motor circuit may be interrupted by manually placing switch contactors 68 and 69 in the "off" position.

Of course, rather than manually terminating the operation of motor 11 of my improved linear actuating mechanism, termination may be accomplished automatically by any one of a number of ways well known in the art; e.g. limit switches located at positions "A" and "B."

Thus, it will be seen from the foregoing that the linear actuating mechanism, including motor 11, worm 32, and element 44 may be conveniently mounted as a single compact unit and used in connection with previously installed fixtures with a minimum of trouble and labor. In addition, my improved mechanism incorporates inexpensive component parts to transform rotary motion efficiently into linear motion and due to the driving connection provided between the worm and bead chain, operates silently with a high degree of efficiency.

It will therefore be appreciated that the present invention is applicable to a great variety of uses where it is desired to convert one type of motion directly into another type; e.g. opening and closing garage doors, and the accompanying drawings are merely indicative of one application to which my improved linear actuating arrangement may be satisfactorily employed. Thus, it should be obvious to those skilled in the art that the present invention with its inherent advantages may be structurally varied without a departure from the true scope and spirit of the invention. For instance, FIG. 5 illustrates a second embodiment of my new and improved linear actuating mechanism.

As shown in FIG. 4, the mechanism includes an electric motor 11 power means, essentially of the same construction as that described for FIGS. 1–3 inclusive, where identical parts with those heretofore described are identified by like reference numerals. In the embodiment of FIG. 4, worm member 80 is formed of a helically wound heavy wire into evenly spaced apart turns to define a helical thread having, in effect, a gear pitch and lead. Although the worm resembles a helically wound spring in appearance, its properties are dissimilar in that it is preferably wound to give only very small deflections in an endwise direction. Its properties thus approach that for a straight rod when subjected to forces in compression or tension. Worm 80 is secured to rotate with rotor shaft 23 by a collar 81 which receives the extreme end of the shaft in abutting relation with an axial extension 83 of the worm. Set screws 84 and 85 may be used to prevent relative movement between the collar and the respective shaft and worm members.

Rather than using an endless elongated flexible bead chain 40 as shown in FIGS. 1–3, the bead chain of FIG. 4, identified by numeral 40a, may be constructed in a single run or length, only a portion of the length being illustrated. The chain supporting element of this embodiment, shown at 86, like the illustrated element 44 of the first embodiment, is fastened to the face of the motor. Element 86 includes a transverse block 87, arranged between separated parallel walls 88 (one wall being illustrated). The block is furnished with chain guiding groove 51 adjacent the periphery of the worm as in the mechanism of FIGS. 1–3. Groove 51 functions to urge the bead chain into positive engagement with the turns of worm and to guide the chain past the worm onto a small idler pulley 89, which is rotatably mounted in between element walls 88 in axial alignment with groove 51 in the manner described heretofore for pulley 55.

In the mechanism of FIG. 4, chain supporting element 86 is provided with an arrangement for holding the chain on pulley 89 under a proper degree of tension and for storing the bead chain when worm 80 drives the chain in the direction of the arrow, toward pulley 89. The arrangement comprises a roller or spool 90 having a cylindrical body carried by a longitudinal pin 91 supported by the element walls. A conventional tension spring 92 is suitably attached to the spool, as by hooking spring end 93 into an accommodating hole in the spool body. The other end 94, of the spring is connected to the last bead 41a of chain 40a, spring 92 being shown in the extended position. Preferably, for best results, pulley 89 should be approximately ⅔ the transverse dimension of spool 90, the spool having sufficient space between the element walls 92 to store the desired length of spring and bead chain around the spool body. If desired, the other end of the bead chain 40a (not shown) may be tensioned and stored by a similar spool and spring arrangement in order to keep the length of chain under proper tension regardless of the direction of travel of the chain.

Turning now to FIG. 5, there is illustrated still another embodiment of the present invention, which as shown, incorporates a gear reduction speed reducer system in one form. More specifically, by way of example, the gear train includes a small spur type gear 96, fastened directly to rotor shaft 23 of electric motor 11 (not shown in FIG. 5), and a larger meshing spur gear 97 provided with a substantially cylindrical body portion 98 preferably composed of a polyester like nylon. A bore is furnished centrally of body portion 98, the inner face of which is formed into helical threads defining an internal worm member 99. Gear 97 is rotatably journalled on a stationary shaft 100 which extends axially beyond each side of the cylindrical body portion of the gear. The ends of the shaft are, in turn, suitably mounted in a supporting block 101, a part of only one block being shown in FIG. 5 for ease and simplicity of illustration. Shaft 100 is provided with a longitudinal groove 102 for its entire length for slidably accommodating bead chain 40b in the manner previously described for groove 51 of the first embodiment. Thus, groove 102 is in communication with the helical threads of worm 99 and maintains the chain in positive engagement with the worm.

By the proper selection of gears employed between worm 99 and rotor shaft 23, the desired linear speed of chain 40b may be readily achieved. For instance, let it be assumed that rotor shaft 23 rotates with a speed of 1600 revolutions per minute, a standard speed for small motors, and it is desired to move bead chain 40b, at a rate of 100 inches per minute and the chain has beads disposed such that they in effect define a lead of ¼ inch. This may be accomplished by making the lead of worm; i.e., the linear distance that the worm thread would advance if it made a complete revolution, ¼ inch and providing gears 96 and 97 with a tooth ratio of 1 to 4, that is, gear 96 having 12 teeth and gear 97 having 48 teeth. It will be seen from this example that it is relatively simple, employing the bead chain and worm gear in combination with a suitable train of gears, to obtain the desired linear speed of the bead chain.

It should be apparent to those skilled in the art, while I have shown and described what at present is considered to be the preferred embodiment of my invention in accordance with the patent statutes, changes may be made in the structure disclosed without actually departing from the true spirit and scope of this invention, and I therefore intend to cover in the following claims all such equivalent variations as fall within the invention.

What I claim as new and desire to secure by Letters Patent of the United States is:

1. In an arrangement for driving at least one traveling device in a linear direction, an elongated flexible ball chain including a plurality of spaced apart balls and a plurality of links joining the balls together to define a gear pitch, means connecting the traveling device to move with said chain, an electric motor including a shaft, a rotatable member secured to said shaft having helical threads in operative engagement with said balls, means carried by said motor including a channel extending axially away from said motor adjacent said shaft for maintaining said chain in positive engagement with said rotatable member to prevent slippage between said rotatable member and said chain whereby rotation imparted to said rotatable member from said motor is translated into linear motion of said device through the intermediate cooperation between said helical threads of said rotatable member and the balls of said chain, said means carried by said motor including a rotatable element mounted generally between the channel and motor interior for guiding the chain angularly into or out of said channel.

2. In an arrangement for driving at least one traveling device in a linear direction, a reversible motor having a rotatable shaft, switch means for controlling the direction of rotation of said motor shaft, an elongated chain including a plurality of spaced apart raised portions joined together to form an endless length of chain having a gear pitch, a worm gear driven by and secured to said motor shaft and having helical threads in operative engagement with said chain beads, an assembly positioned adjacent the threads of said worm gear having at least one channel for maintaining said chain in position engagement with said worm to prevent slippage and binding therebetween, a pair of spaced apart pulleys supporting said chain for continuous movement with one of said pulleys rotatably mounted on said assembly and having a circumferential groove adjacent the termination of said channel for directing the chain in a predetermined direction as it travels into and out of said channel, and means including a friction connection between said traveling device and said chain, whereby said device and chain will move together in a linear direction under a predetermined load applied to said device and said chain will slip relative to said device when the applied load is increased beyond said predetermined amount to enable the chain to continue movement without a corresponding movement of said device.

3. A mechanical movement mechanism comprising at least one elongated flexible chain member including a plurality of spaced apart raised portions joined together at generally equal intervals to define a gear pitch, an electric motor having a rotatable member, and a worm member secured to one end of said rotatable member formed of evenly spaced helical turns of relatively stiff wire material extending axially away from said rotatable member in driving relation with said raised portions with the axis of said chain member and the helical wire turns of said worm member being generally parallel whereby rotary motion of said worm member is translated directly into linear motion of said chain.

4. A mechanical movement and gear reduction arrangement comprising: a substantially cylindrical rotatable member having an internal bore formed with helical threads and an outer surface formed with gear means, a reduction gear in driving relation with said gear means, a shaft arranged through said internal bore for rotatably supporting said member and having a groove extending at least from one end of said internal bore axially to the other end, and an elongated flexible ball chain including a plurality of balls joined together by a plurality of links to define a gear pitch, said ball chain having a length thereof disposed in said shaft groove in engagement with said helical threads of said rotatable member whereby the speed of rotation imparted to said cylindrical member by said reduction gear is reduced and the rotary motion of said member is directly translated into linear motion of said ball chain.

5. In a linear actuating mechanism including an elongated flexible output chain having a plurality of spaced apart raised portions defining a gear pitch, a driving unit comprising an electric motor including driving means, said driving means comprising a shaft and a member having helical threads rotatably driven by and secured to said shaft for imparting linear motion to the chain, and means carried by said motor and positioned adjacent said member for maintaining a part of said chain in positive engagement with said helical threads, said means carried by said motor including spaced apart walls extending axially away from the interior of the motor and terminating in a transverse section joined to said walls, said section having a channel running parallel to said shaft for receiving the part of said chain, and said walls mounting a rotatable member generally between said motor and said channel for guiding the chains relative to the channels.

6. In a linear actuating mechanism including an elongated flexible output chain having a plurality of spaced apart beads joined together at generally equal intervals to define a gear pitch, a driving unit comprising an electric motor including a frame, a rotatable shaft projecting axially beyond said frame, a worm gear secured to said shaft and having helical threads for imparting linear motion to the chain, and a member carried by said motor including at least one groove disposed adjacent the peripheral surface of said worm threads for maintaining said chain in positive engagement with said helical threads thereby insuring that there will be no slippage between said helical threads and said chain, said member comprising a section mounted to said frame, a pair of walls joined to said section projecting axially away from said frame on either side of said shaft, and a transverse block extending between said walls formed with the groove.

7. In a linear actuating mechanism including an elongated flexible output bead chain having a plurality of spaced apart raised portions joined together at generally equal intervals to define a gear pitch, a driving unit comprising an electric motor having a frame and a rotatable shaft projecting axially beyond said frame, a worm secured to said shaft and formed with helical threads on the outer surface thereof imparting linear motion to the chain, said frame mounting a chain supporting assembly, said assembly including at least one axially extending groove positioned adjacent the periphery of said worm for slidably receiving a length of the chain and for maintaining the chain length in positive engagement with said worm, and a curved member rotatably carried by said assembly between said groove and said motor frame adapted to support and guide the chain in an angular direction around the axis of rotation of said curved member as it moves into or out of engagement with said worm.

8. A mechanical movement arrangement comprising a generally cylindrical rotatable member having an internal bore formed with helical threads; a shaft arranged through said internal bore for supporting and journaling said member for relative rotation; said shaft including a longitudinal generally U-shaped groove in communication with its outer surface extending the axial length of said internal bore; and an elongated flexible chain member including a plurality of spaced apart raised portions defining a gear pitch having a length disposed in said groove with said raised portions projecting above the peripheral surface of the shaft and into engagement with the helical thread of said member, whereby movement of one of said members is directly translated into motion of the other member.

9. In a linear actuating arrangement including an elongated flexible chain having a plurality of spaced apart raised portions defining a gear pitch; a driving unit comprising an electric motor having a frame, a rotatable shaft, and a worm having helical threads for imparting linear motion to the chain mounted on said shaft; a chain supporting assembly projecting axially away from said frame adjacent said worm comprising a generally U-shaped groove disposed adjacent the periphery of said worm for slidably receiving and maintaining a length of the chain in positive engagement with said worm; means carried by said motor spaced from said groove for storing a portion of said chain; said assembly mounting means generally between one end of said groove and frame and generally between said chain storing means and frame for guiding the chain between said groove and said chain storing means.

10. In a linear actuating arrangement including an elongated flexible chain having a plurality of spaced apart raised portions defining a gear pitch, a driving unit comprising an electric motor having a frame and a shaft; a worm having helical threads rotatably driven by said motor shaft for imparting linear motion to the chain; said frame including chain supporting means disposed adjacent said worm, said means including walls projecting away from said rotor adjacent said shaft and worm and having a first groove arranged adjacent the periphery of said worm for receiving and maintaining a length of the chain in positive engagement with said worm, said means further including a second groove arranged beyond one end of the first groove extending angularly toward and then away from the first groove for guiding the chain in a predetermined angular direction as it travels into or out of said groove.

References Cited in the file of this patent

UNITED STATES PATENTS

| | | |
|---|---|---|
| 418,328 | Willett | Dec. 31, 1889 |
| 595,508 | Wolander | Dec. 14, 1897 |
| 627,467 | Auble | June 27, 1899 |
| 627,468 | Auble | June 27, 1899 |
| 642,430 | Corcoran | Jan. 30, 1900 |
| 866,316 | Adler | Oct. 15, 1907 |
| 1,346,625 | Woodward | July 13, 1920 |
| 1,416,163 | Bock | May 16, 1922 |
| 1,983,962 | Barber et al. | Dec. 11, 1934 |
| 2,240,087 | Barrett | Apr. 29, 1941 |
| 2,264,549 | Pecker | Dec. 2, 1941 |
| 2,598,709 | Morris | June 3, 1952 |
| 2,635,479 | Uhertini | Apr. 21, 1953 |
| 2,645,432 | Griffitts | July 14, 1953 |
| 2,825,231 | Wasko | Mar. 4, 1958 |
| 2,898,083 | Kresl | Aug. 4, 1959 |

FOREIGN PATENTS

| | | |
|---|---|---|
| 438,735 | France | Mar. 22, 1912 |
| 390,610 | Germany | Feb. 21, 1924 |